United States Patent
Naguib

(10) Patent No.: US 9,118,666 B2
(45) Date of Patent: *Aug. 25, 2015

(54) COMPUTING DEVICE INTEGRITY VERIFICATION

(75) Inventor: Nayer Naguib, Dublin (IE)

(73) Assignee: Google Inc., Mountain View, CA (US)

(*) Notice: Subject to any disclaimer, the term of this patent is extended or adjusted under 35 U.S.C. 154(b) by 25 days.

This patent is subject to a terminal disclaimer.

(21) Appl. No.: 13/306,328

(22) Filed: Nov. 29, 2011

(65) Prior Publication Data

US 2015/0200934 A1 Jul. 16, 2015

Related U.S. Application Data

(63) Continuation-in-part of application No. 13/237,121, filed on Sep. 20, 2011, which is a continuation-in-part of application No. 12/827,330, filed on Jun. 30, 2010.

(51) Int. Cl.
| | |
|---|---|
| *G06F 11/30* | (2006.01) |
| *H04L 29/06* | (2006.01) |
| *G06F 21/57* | (2013.01) |
| *H04L 9/32* | (2006.01) |

(52) U.S. Cl.
CPC .......... *H04L 63/0853* (2013.01); *G06F 21/575* (2013.01); *H04L 9/3247* (2013.01); *H04L 63/0823* (2013.01); *G06F 2221/031* (2013.01)

(58) Field of Classification Search
CPC ................................. G06F 21/57; G06F 21/575
USPC .......................................... 713/188, 2; 726/25
See application file for complete search history.

(56) References Cited

U.S. PATENT DOCUMENTS

| | | |
|---|---|---|
| 6,192,477 B1 | 2/2001 | Corthell |
| 6,961,759 B2 | 11/2005 | Brown et al. |

(Continued)

FOREIGN PATENT DOCUMENTS

| | | |
|---|---|---|
| WO | 2006120365 A1 | 11/2006 |
| WO | 2008067124 A2 | 6/2008 |

OTHER PUBLICATIONS

Gookwon Edward Suh (AEGIS: A Single-Chip Secure Processor, 2005).*

(Continued)

*Primary Examiner* — Saleh Najjar
*Assistant Examiner* — Oleg Korsak
(74) *Attorney, Agent, or Firm* — Lerner, David, Littenberg, Krumholz & Mentlik, LLP

(57) ABSTRACT

An integrity verification process is performed by an integrity verification module of a client computing device. When the computing device is powered-up, but before an operating system is booted, the integrity verification module performs an integrity check of the computing device and gathers integrity verification information to ensure that the system is secure. If the system passes the integrity check, the system boots to a browser session which is capable of communicating with a cryptographic module. In response to a request from a service provider, the computing device retrieves the integrity verification information and signs the integrity verification information using a private key from the cryptographic module and forwards the signed data to the service provider. The integrity of the computing device may then be verified using a known public key of the cryptographic module that is accessible from a trusted third party.

21 Claims, 10 Drawing Sheets

(56) References Cited

U.S. PATENT DOCUMENTS

| | | | |
|---|---|---|---|
| 7,072,869 | B2 | 7/2006 | Guthery |
| 7,117,369 | B1 | 10/2006 | Burns et al. |
| 7,130,951 | B1 | 10/2006 | Christie et al. |
| 7,315,830 | B1 | 1/2008 | Wirtz et al. |
| 7,424,398 | B2 * | 9/2008 | Booth et al. ............ 702/186 |
| 7,571,484 | B2 | 8/2009 | Kraus et al. |
| 7,716,494 | B2 | 5/2010 | Liu et al. |
| 7,831,838 | B2 | 11/2010 | Marr et al. |
| 7,844,551 | B1 | 11/2010 | Bottner et al. |
| 8,108,318 | B2 | 1/2012 | Mardikar |
| 8,171,295 | B2 * | 5/2012 | Munetoh et al. ............ 713/176 |
| 8,181,020 | B2 | 5/2012 | Flynn |
| 8,312,523 | B2 | 11/2012 | Geller |
| 2002/0016913 | A1 | 2/2002 | Wheeler et al. |
| 2005/0119978 | A1 | 6/2005 | Ates |
| 2006/0015717 | A1 | 1/2006 | Liu et al. |
| 2006/0090084 | A1 | 4/2006 | Buer |
| 2006/0161435 | A1 | 7/2006 | Atef et al. |
| 2006/0242423 | A1 | 10/2006 | Kussmaul |
| 2007/0005492 | A1 | 1/2007 | Kim |
| 2007/0088950 | A1 | 4/2007 | Wheeler et al. |
| 2007/0219926 | A1 | 9/2007 | Korn |
| 2008/0005560 | A1 | 1/2008 | Duffus et al. |
| 2009/0119194 | A1 | 5/2009 | Chau et al. |
| 2009/0282247 | A1 | 11/2009 | Kirkup et al. |
| 2010/0088237 | A1 | 4/2010 | Wankmueller |
| 2011/0004721 | A1 * | 1/2011 | Smith et al. ............ 711/103 |
| 2011/0083173 | A1 | 4/2011 | Baghdasaryan et al. |
| 2011/0231332 | A1 | 9/2011 | Abraham et al. |

OTHER PUBLICATIONS

Arbaugh, William A.; Farber, D.J.; Smith, Jonathan M., "A Secure and Reliable Bootstrap Architecture." Security and Privacy, 1997, Proceedings., 1997 IEEE Symposium on. 1997, pp. 65-71 [retrieved on Mar. 6, 2013 from IEEE database].

* cited by examiner

COMPUTING DEVICE INTEGRITY VERIFICATION

CROSS REFERENCE TO RELATED APPLICATIONS

The present application is a continuation-in-part of U.S. patent application Ser. No. 13/237,121, filed Sep. 20, 2011, which is a continuation-in-part of U.S. patent application Ser. No. 12/827,330 filed Jun. 30, 2010, the entire disclosures of which are incorporated by reference herein.

BACKGROUND

The disclosure relates generally to computing device verification and, more particularly, to verifying client integrity in a distributed computing environment.

Many categories of Internet based services require a high degree of security. Examples include Internet banking, electronic interaction with government services, and documents or files provided with legally binding digital signatures. Typical computing environments may not have adequate security for preventing exposure to attacks that seek to capture user-provided information and to use the captured information to process fraudulent transactions.

Unscrupulous third parties may capture user-provided information in a variety of ways. In one example, a keylogger program may be installed on the user's computer to capture information typed via a keyboard. The keylogger program may be installed by exploiting operating system vulnerabilities or by misleading the user into executing malicious software. In another example, the user may be lead to a malicious website that captures user-provided information. In a further example, a computer display may be manipulated to mislead the user into signing a fraudulent transaction using a legally-binding digital signature.

Existing computer systems are unable to prevent the capture of information by these sophisticated attacks. Many browsers and Internet security programs warn against visiting websites with invalid security certificates or following phishing links. However, such warnings are commonly ignored. In addition, existing operating systems may be patched at any level (e.g., bootloader, kernel, drivers, etc.). Accordingly, such warnings may be disabled by malicious software.

It may be difficult to avoid malicious software from acting as a keylogger or modifying a user's display. New versions of malicious software are under continuous development, and may be tailored to target a limited set of users. Thus, some malicious software may be undetectable by up-to-date anti-virus and internet security software. In some cases, a computing system may be infected without the user installing any software, as in the case of browser vulnerabilities which allow remote code execution.

SUMMARY

Aspects of the disclosure provide an integrity verification process performed by an integrity verification module of a client computing device. When the computing device is powered-up, but before an operating system is booted, the integrity verification module performs an integrity check of the computing device and gathers integrity attestation information to ensure that the system is secure. If the system passes the integrity check, the system boots to a browser session capable of communicating with a cryptographic module. A user may then log-in to the system and access the website of a service provider to initiate a transaction. In response to a request from the service provider, the computing device retrieves the integrity attestation information and signs the integrity attestation information using a private key from the cryptographic module and forwards the signed data to the service provider. The integrity of the computing device may then be verified using a known public key of the cryptographic module that is accessible from a trusted third party site.

In some aspects, software executing on the computing device exposes a limited user interface that cannot be used to modify the system to send the integrity attestation information to untrusted entities.

In other aspects, the hardware of the computing device is tamper-resistant such that a malicious entity cannot change the wiring or physical connections of the cryptographic module in an attempt to override detection of a security breach by the computing device.

In some embodiments, a computer-implemented method provides a secure operating mode of a computing device. The method includes receiving a signal to provide power to a computing device. Before booting an operating system of the computing device, a determination is made using an integrity verification module as to whether an integrity of the computing device is verified. The integrity of the computing device is verified when a secure mode of the operating system is loaded into memory of the computing device. When the integrity of the computing device is verified, a cryptographic module is enabled to forward an indication that the computing device is secure to a first computer. A response to the forwarded indication is received from the first computer. The response indicates that the computing device is secure. A transaction is initiated with the first computer.

In some embodiments, a system provides a secure operating mode of a computing device. The system includes an integrity verification module and a cryptographic module operable. The integrity verification module is operable to: receive a signal to provide power to the computing device; and determine that an integrity of the computing device is verified when a secure mode of the operating system is loaded into memory of the computing device. The integrity of the computing device is determined before the operating system is booted. When the integrity of the computing device is verified, the cryptographic module is operable to forward an indicator that the computing device is secure to a first computer. A response is received to the forwarded indicator from the first computer. The response indicates that the computing device is secure. The cryptographic module is operable to initiate a transaction with the first computer.

DETAILED DESCRIPTION

Figure 1:
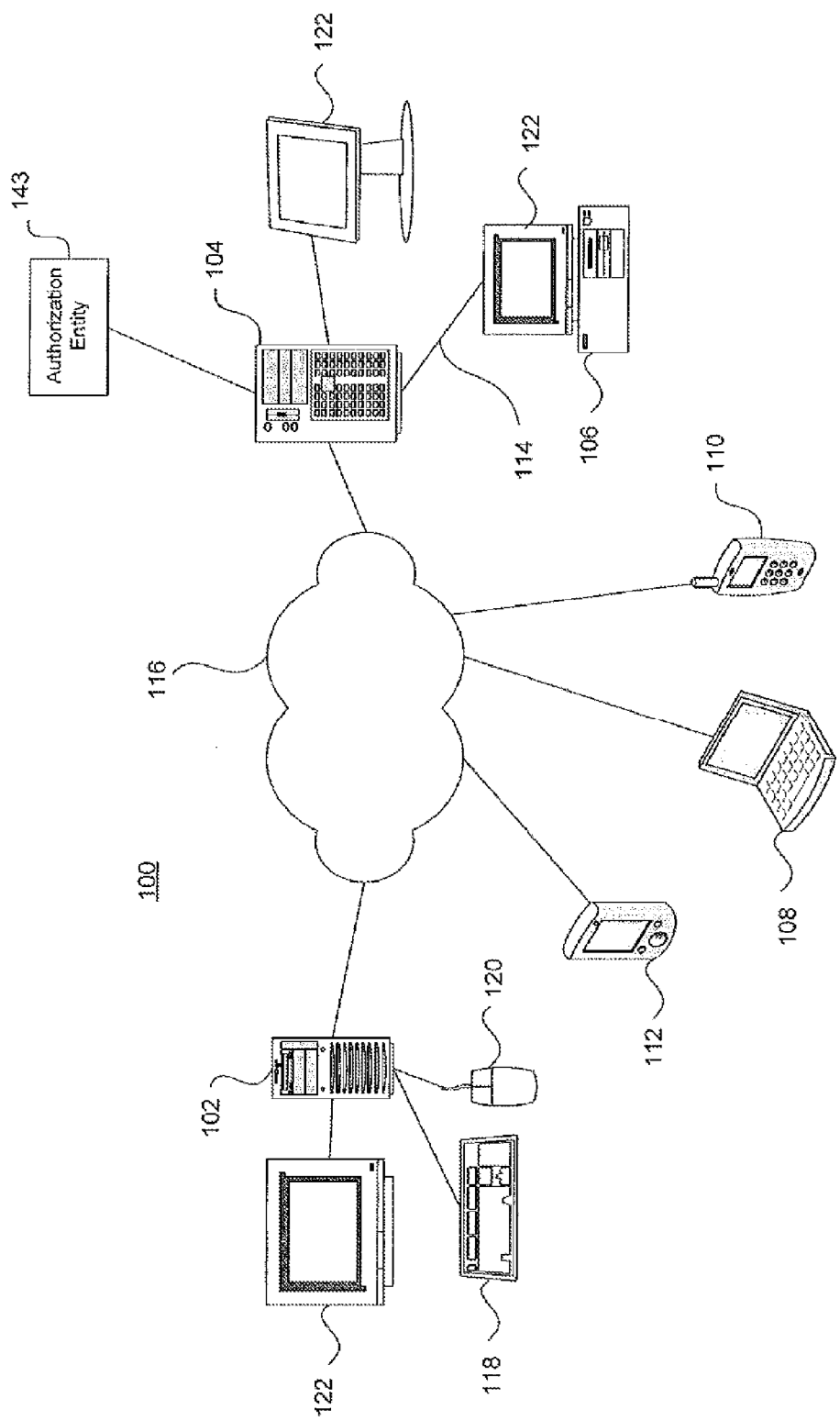
FIG. 1 illustrates a system in accordance with example embodiments.

The aspects, features and advantages of the present disclosure will be appreciated when considered with reference to the following description of preferred embodiments and accompanying figures. The following description does not limit the disclosure; rather, the scope is defined by the appended claims and equivalents.

While certain processes in accordance with example embodiments are shown in the figures as occurring in a linear fashion, this is not a requirement unless expressly stated herein. Different processes may be performed in a different order or concurrently.

The disclosure describes systems and methods for allowing a user to select a secure operating mode of a computing device and to conduct a secure online transaction by appending a digital signature generated on the device. Before receiving selection of the secure operating mode, boot firmware verifies a bootloader of an operating system. Then, in response to receiving selection of the secure operating mode, the bootloader verifies the operating system kernel. The kernel then verifies operating-system level executable files (e.g., device drivers). After verification, a limited set of executable files may be loaded into a portion of the memory that is identified by the kernel as read-only memory. These read-only files are executed to provide a basic Internet browser session. Meanwhile, all other files may be identified as non-executable. When the user conducts a transaction with an authorized website, information provided by the user is inaccessible by other parties, since the information is only transiently stored in system memory.

In some embodiments, the same operating system kernel can be used for both normal and secure modes. In one example, the bootloader (or BIOS) passes a parameter to the kernel to specify whether to boot in normal mode or in secure mode based on user selection. Most modern operating system kernels can accept parameters that specify different modes of operation. Accordingly, it is unnecessary to install two separate operating systems (or different subsets of operating system files, such as different kernels, drivers, etc.)

Other example embodiments provide systems and methods that allow a user to conduct security-critical transactions with an authorized website over a network, such as the Internet. After specifying transaction details to the authorized website, a cryptographic hash function may be applied to the transaction data to produce a cryptographic hash value or checksum, which may be a fixed or variable size bit string. A digital signature may be derived by encrypting the checksum via the private key. The generated digital signature may be appended to the data and transmitted to the authorized website. A unique identifier assigned to a cryptographic chip is transmitted in advance to the authorized website. In turn, the website may verify the digital signature by decrypting the signature via the public key and applying the same hash function to the data. If the decrypted digital signature matches the checksum hashed from the data, the remote computer may deem the digital signature valid thereby approving the requested transaction. The public key may be associated with the unique identifier assigned to the cryptographic chip such that the public key may be retrieved when the corresponding unique identifier is provided. If the public key is not stored by a service provider through a registration process that involves securely exporting the public key from the cryptographic chip to the service provider, then the public key has to be served by a trusted third party through a secure communication channel. While references are made herein to public-key cryptography, it is understood that any cryptographic approach may be utilized.

Other example embodiments provide systems and methods that provide an integrity verification process performed by an integrity verification module of a client computing device. When the computing device is powered-up, but before an operating system is booted, the integrity verification module performs an integrity check of the computing device and gathers integrity attestation information to ensure that the system is secure. If the system passes the integrity check, the system boots to a browser session which is capable of communicating with a cryptographic module. A user may then log-in to the system and access the website of a service provider to initiate a transaction. In response to a request from the service provider, the computing device retrieves the integrity attestation information and sighs the integrity attestation information using a private key from the cryptographic module and forwards the signed data to the service provider. The integrity of the computing device may then be verified using a known public key of the cryptographic module that is accessible from a trusted third party site.

FIG. 1 presents a schematic diagram of a computer system depicting various computing devices that can be used alone or in a networked configuration in accordance with aspects of the invention. For example, this figure illustrates a computer network 100 having a plurality of computers 102, 104, 106, 108 as well as other types of devices such as a mobile phone 110 and a PDA 112. Such devices may be interconnected via a local or direct connection 114 and/or may be coupled via a network 116 such as a LAN, WAN, the Internet, etc., which may be wired or wireless.

Each device may include, for example, one or more processing devices and have user inputs such as a keyboard 118 and mouse 120 and/or various other types of input devices such as pen-inputs, joysticks, buttons, touch screens, etc., as well as a display 122, which could include, for instance, a CRT, LCD, plasma screen monitor, TV, projector, etc. Each computer 102, 104, 106, 108 may be a personal computer, server, etc. By way of example only, computers 102, 106 may be personal computers while computer 104 may be a server and computer 108 may be a laptop.

Figure 2:
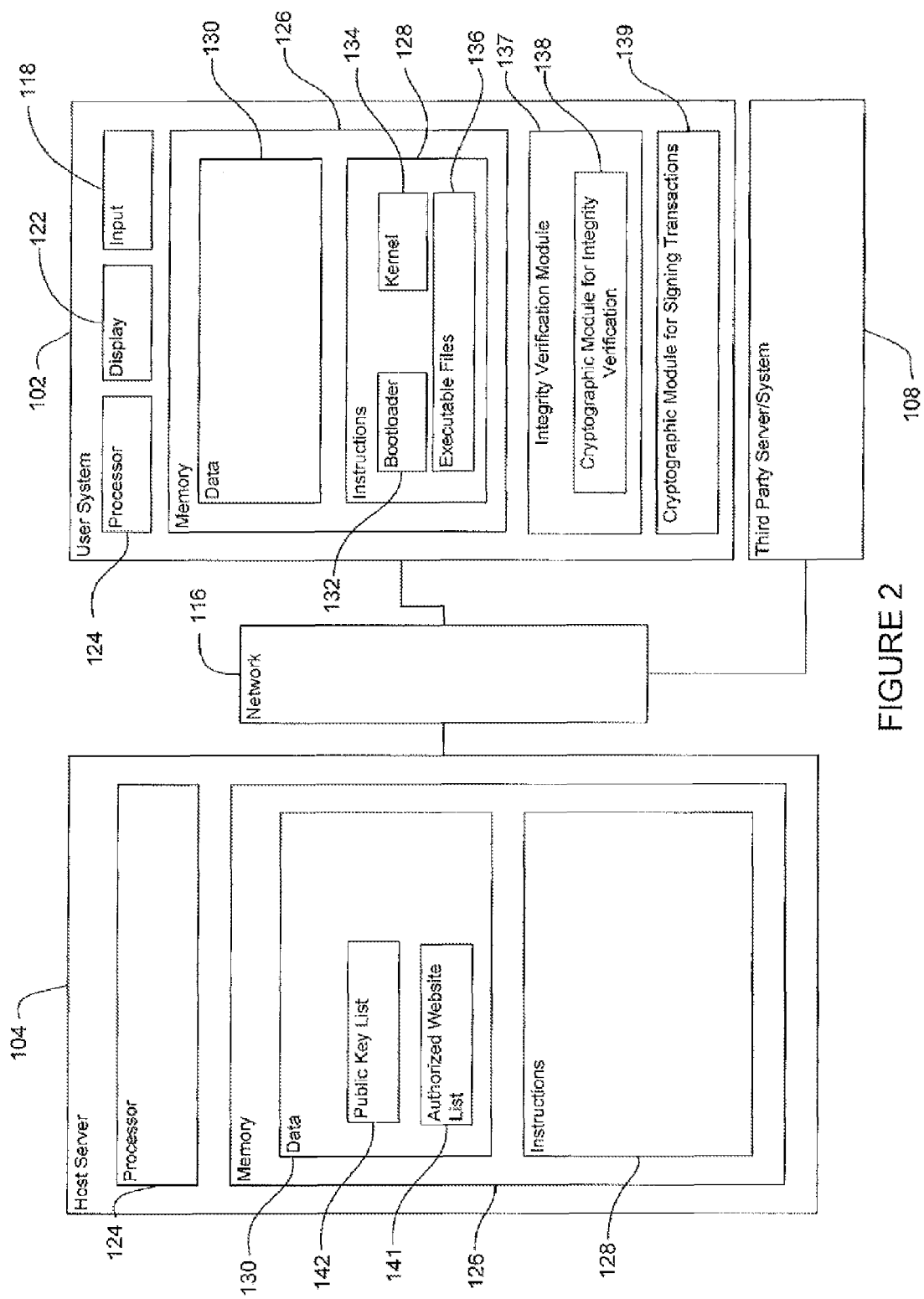
FIG. 2 illustrates aspects of the system of FIG. 1.

As shown in FIG. 2, each computer, such as computers 102, 104, contains a processor 124, memory/storage 126 and other components typically present in a computer. For instance, memory/storage 126 stores information accessible by processor 124, including instructions 128 that may be executed by the processor 124 and data 130 that may be retrieved, manipulated or stored by the processor 124. The memory/storage 126 may be of any type or any device capable of storing information accessible by the processor, such as a hard-drive, ROM, RAM, CD-ROM, flash memories, write-capable or read-only memories. The processor 124 may comprise any number of well known processors, such as a CPU. Alternatively, the processor may be a dedicated controller for executing operations, such as an ASIC.

Computing device 102 may also include an embedded integrity verification module 137 having a cryptographic module 138 for providing integrity information. Integrity verification module 137 may be capable of generating a pair of public-private encryption keys. The private encryption key may be securely stored in integrity verification module 137. The corresponding public key may be exported to preapproved servers across a network. The public key and the private key may be synchronized such that data encrypted with one key can only be decrypted with the corresponding key. Integrity verification module 137 may also have stored thereon instructions that may include any variety of applications. For example, the instructions may instruct processor 124 to request entry of a valid PIN before allowing access to the private encryption key, to generate a public-private key pair, to generate digital signatures, and to pose challenges or security questions. The instructions may also configure processor 124 to allow initialization or modification of the PIN.

Computing device 102 may also include cryptographic module 139 for signing transactions. The cryptographic module 139 may be any integrated circuit suitable for cryptoprocessing. For example, the cryptographic module 139 may be a smart card, a subscriber identity module ("SIM") card, or a customized cryptographic chip that may be embedded or removable from computing device 102. The SIM card may be configured to perform cryptoprocessing functions. The cryptographic module 139 may be assigned a unique identifier by its manufacturer. This identifier may be published together with a public key in order to associate the integrity verification module 139 with its respective public key. In another example, the cryptographic module 139 is a trusted platform module ("TPM") chip configured and arranged in accordance with specifications developed and adopted by the Trusted Computing Group ("TCG"), which is a standard setting entity for hardware security protocols.

The instructions 128 and the instructions included in the integrity verification module 137 together may comprise any set of instructions to be executed directly (such as machine code) or indirectly (such as scripts) by the processor(s). In that regard, the terms "instructions," "steps" and "programs" may be used interchangeably herein. The instructions may be stored in any computer language or format, such as in object code or modules of source code.

In accordance with aspects of the invention, the instructions 128 on computing device 102 may include a bootloader 132, an operating system kernel 134 and executable files 136. The bootloader 132 loads and executes the operating system kernel 134. The operating system kernel 134 continues startup procedures for computing device 102 by linking application software (e.g., executable files 136) and the computer hardware (e.g., processor 124, display 122, keyboard 118, and mouse 120). The functions, methods and routines of instructions in accordance with the invention are explained in more detail below.

Data 130 may be retrieved, stored or modified by processor 124 in accordance with the instructions 128 and/or the instructions in the integrity verification module 137. The data may be stored as a collection of data.

The data may also be formatted in any computer readable format such as, but not limited to, binary values, ASCII or Unicode. Similarly, the data may include images stored in a variety of formats such as vector-based images or bitmap images using lossless (e.g., PNG) or lossy (e.g., JPEG) encoding. Moreover, the data may include any information sufficient to identify the relevant information, such as descriptive text, proprietary codes, pointers, references to data stored in other memories (including other network locations) or information which is used by a function to calculate the relevant data.

The data 130 stored on computing device 102 may comprise information regarding the minimum set of executable files 136 that are required to provide a user with a basic Internet browser session. The data 130 on computer 104 may include a list 141 of specific websites that are recognized as being secure (e.g., an "authorized website list"). Data 130 of computer 104 may also contain a public key list 142 that is indexed by the manufacturer-assigned unique identifier of a respective cryptographic module 139. Authorized websites may query public key list 142 to obtain the public key corresponding to the computing device targeted for secure information exchange.

Although the processor 124 and memory 126 are functionally illustrated in FIG. 2 as being within the same block, it will be understood that the processor 124 and memory 126 may actually comprise multiple processors and memories that may or may not be stored within the same physical housing or location. For example, some or all of the instructions and data may be stored on a removable CD-ROM and others within a read-only computer chip. Some or all of the instructions and data may be stored in a location physically remote from, yet still accessible by, the processor. Similarly, the processor may actually comprise a collection of processors which may or may not operate in parallel. Data may be distributed and stored across multiple memories 126 such as hard drives or the like.

The computer 104 may communicate with one or more client computers 102, 106 and/or 108, as well as devices such as mobile phone 110 and PDA 112. Each client computer or other client device may be configured similarly to the computer 102, with a processor, integrity verification module, memory and instructions, as well as one or more user input devices 118 and a user output device, such as display 122. Each client computer may be a general purpose computer, intended for use by a person, having all the components normally found in a personal computer such as a central processing unit ("CPU"), display, CD-ROM or DVD drive, hard-drive, mouse, keyboard, touch-sensitive screen, speakers, microphone, modem and/or router (telephone, cable or otherwise) and all of the components used for connecting these elements to one another.

The computer 104 and other devices are capable of direct and indirect communication with other computers, such as over network 116. Although only a few computing devices are depicted in FIGS. 1 and 2, it should be appreciated that a typical system can include a large number of connected servers and clients, with each different computer being at a different node of the network. The network 116, and intervening nodes, may comprise various configurations and protocols including the Internet, intranets, virtual private networks, wide area networks, local networks, private networks using communication protocols proprietary to one or more companies, Ethernet, WiFi, Bluetooth or TCP/IP.

Communication across the network 116, including any intervening nodes, may be facilitated by any device capable of transmitting data to and from other computers, such as modems (e.g., dial-up or cable), network interfaces and wireless interfaces. Although certain advantages are obtained when information is transmitted or received as noted above, other aspects of the invention are not limited to any particular manner of transmission of information. For example, in some aspects, the information may be sent via a medium such as a disk, tape, CD-ROM, or directly between two computer systems via a dial-up modem.

Moreover, computers and user devices in accordance with the systems and methods described herein may comprise any device capable of processing instructions and transmitting data to and from other computers, including network computers lacking local storage capability, PDAs with modems such as PDA 112 and Internet-capable wireless phones such as mobile phone 110.

As shown in FIG. 1, the computer network 100 may also include an authorization entity 143, which may be directly or indirectly coupled to computer 104. In an alternative, the authorization entity 143 may be part of or otherwise logically associated with the computer 104.

When computing device 102 is first powered on, computing device 102 does not have an operating system stored in ROM or RAM. The bootloader 132 executes a program stored in memory 126 to load the operating system kernel 134. The bootloader 132 also loads the minimum amount of data needed by the kernel 134 to access other portions of memory 126 from which the executable files 136 and data are loaded. Although only one bootloader 132 is shown in FIG. 2, it is understood that multiple stage bootloaders may be used to sequentially load and process several programs to boot computing device 102.

Once loaded, the operating system kernel 134 continues startup procedures for computing device 102. The kernel 134 provides a bridge between application software and the data processing that is performed at the hardware level. The kernel 134 manages system resources by communicating between hardware and software components of the computer.

The authorization entity 143 and the sever 104 may comprise an authorization server. As will be explained in more detail below, the authorization entity 143 is operable to identify specific websites as secure. This may be accomplished by performing a verification process and maintaining a list of the websites that are identified as being authorized. In accordance with aspects of the invention, the authorized websites may be accessed by computing device 102 during a secure operating mode such that any information provided by a user while interacting with an authorized website cannot be intercepted by third parties.

While example embodiments are described with reference to accessing websites from a computing device, it is understood that the example embodiments may be used to provide a secure computing environment when accessing any object over any type of network. For example, a computing device operating in the secure mode may communicate over a network to access any object identified by a uniform resource indicator (URI) or uniform resource locator (URL). Similarly, the computing device operating in the secure mode may access an object from any network location such as from an FTP server or a storage area network (SAN).

In one illustrative example, a user wants to process a secure banking transaction, such as a money transfer using a debit account. The user chooses to boot a computing device in the secure operating mode. In the secure operating mode, the bootloader and the kernel are verified and only the executable files that are necessary to provide a basic Internet browsing session are loaded into memory that is subsequently identified a read-only memory by the kernel. Accordingly, the operating system executes on the computing device using a minimum amount of components. The user may then select a bank website from a list of authorized websites displayed by the browser (assuming that the bank has already registered with an authorization entity such that the bank website has already been added to the list of authorized websites). The website is then launched, and the user provides information (e.g., username, password, etc.) in order to successfully login to the website. The user may then initiate the desired transaction, provide all the necessary details, append the digital signature to the details, and confirm the transaction. Since the executable files are operating as read-only, the information provided by the user is temporarily stored in volatile memory that is marked as non-executable by the kernel until the user session ends. However, the user data is not written to permanent storage, which prevents the information from being accessed by unauthorized parties. The user may then log off from the bank website and reboot the computing device to begin another browsing session in normal operating mode.

Figure 3A:
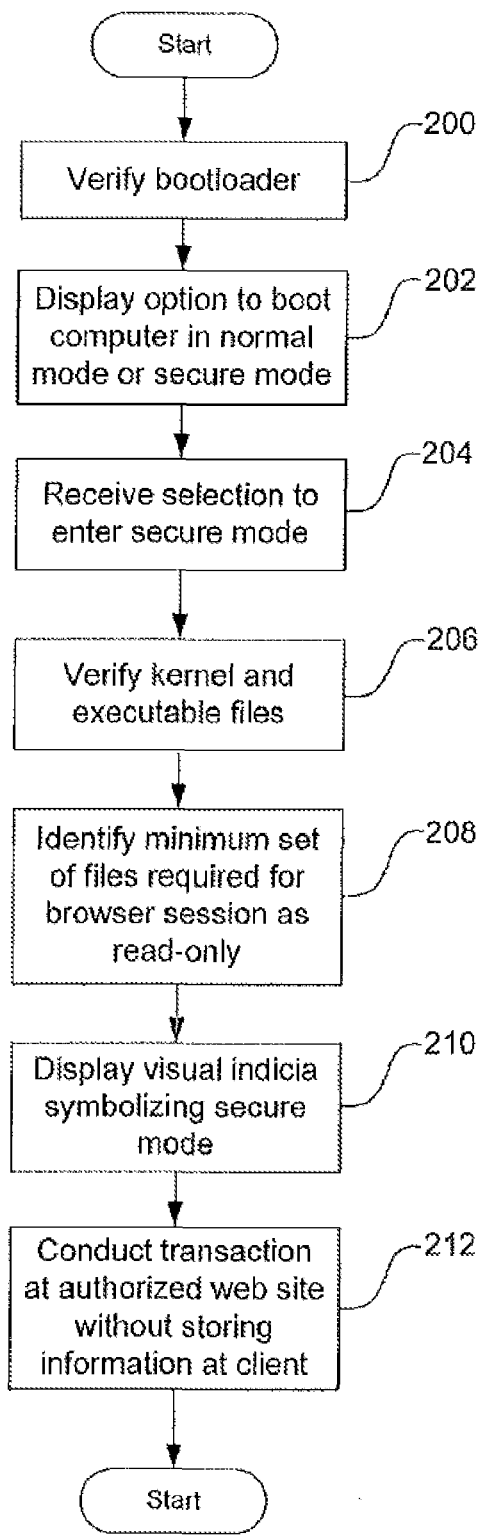
FIGS. 3A-3B illustrate a system and method for operating a computing device in a secure mode to prevent interception of user-provided data in accordance with example embodiments.
Figure 3B:
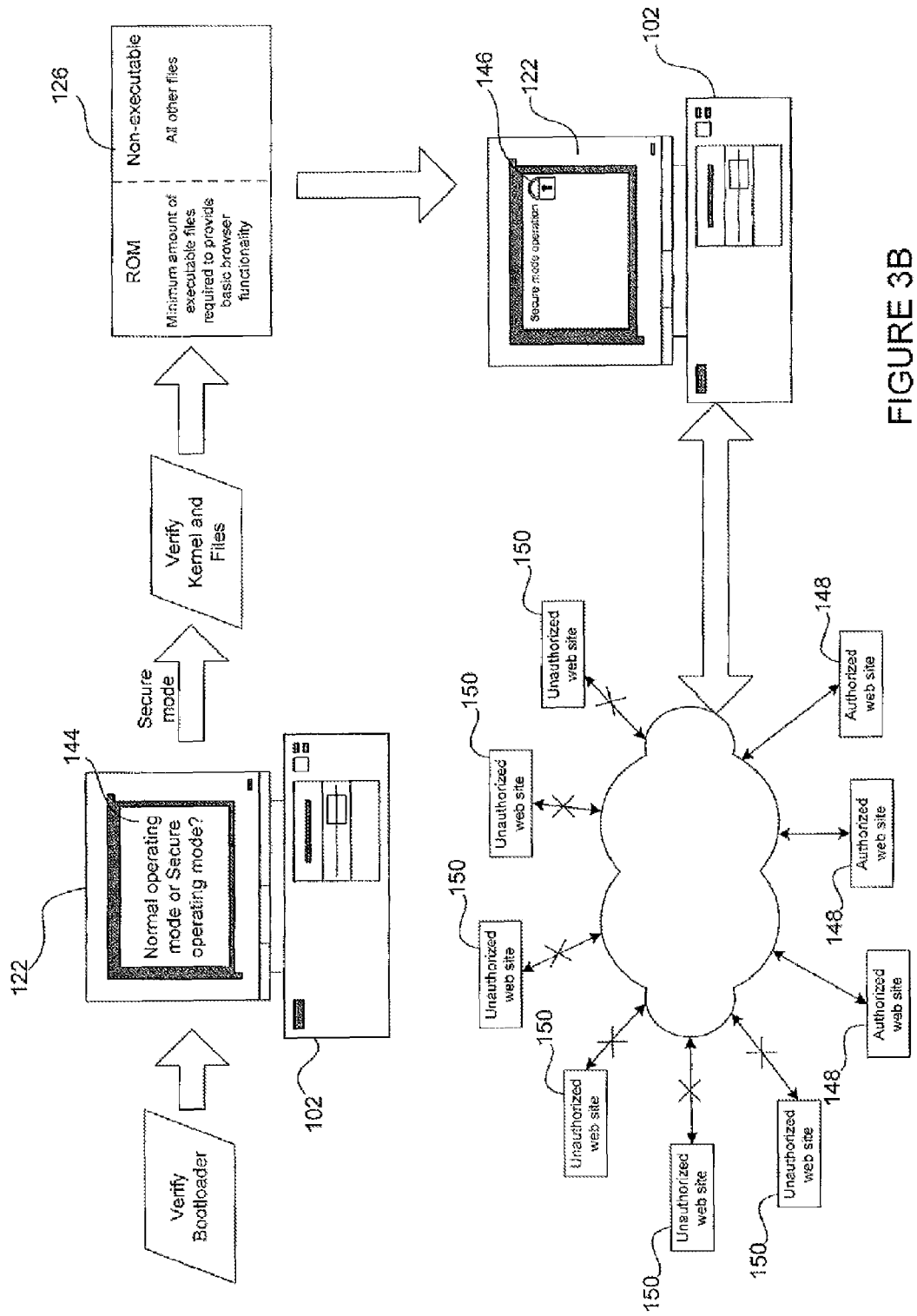

One example embodiment is shown in FIGS. 3A-3B where a user may choose to boot a computing device in a secure operating mode to prevent unauthorized parties from intercepting information provided to a website during a transaction. In particular, FIG. 3A illustrates a flow diagram showing a computer process for conducting an Internet transaction in a secure operating mode. FIG. 3B illustrates general aspects of system interaction between a client and a server. The actions shown in FIG. 3B will be discussed below with regard to the flow diagram in FIG. 3A.

In particular, operation of a computing device 102 is initiated in response to receiving power. Hardware of the computing device (e.g., system BIOS) executes a program that verifies a bootloader (block 200). In one embodiment, boot options are provided by the verified and electronically signed bootloader such that coding the boot options in read-only firmware is unnecessary. The verified bootloader causes a prompt 144 to appear on a display 122 of computing device 102 (block 202). The prompt 144 provides a user with an option to boot computing device 102 in a normal operation mode or a secure operation mode.

In the normal operation mode, the computer hardware activates a bootloader to load and execute the operating system kernel of computing device 102. The kernel initiates startup procedures of computing device 102 including any executable files required to initialize device procedures. Accordingly, all system drivers, processes, installed browser extensions, etc., are loaded into memory 126, including both ROM and RAM as appropriate. The computing device is thereby enabled to access any available website.

The user may select to operate computing device 102 in secure operating mode when the user intends to conduct a transaction at a website requiring the user to provide data (e.g., username/password combinations, financial or medical information, documents secured with an electronic signature, etc.). In the secure operating mode, the user is provided with a limited computing environment in which to browse the Internet or other public or private network. Computing device 102 receives the user selection to operate computing device 102 in a secure mode (block 204).

In response to the user selection of the secure operating mode, the computer hardware activated at power-up initiates verification of the components that will be loaded to read-only memory during the secure operating mode (block 206). The verified bootloader verifies the operating system kernel, which in turn verifies executable files (e.g., device drivers) that are necessary to provide the user with a basic browsing session. The verification process may be performed using known security techniques including the use of a public key to validate the digital signature of each component to be verified.

In one illustrative example, the computer hardware activated at power-up executes a verification application to obtain a unique checksum associated with the component to be verified. The verification application may perform a cryptographic process on the component to arrive at the unique checksum. In addition to being unique, the checksum is cryptographically secure to prevent tampering. Any number of cryptographic algorithms or hashing functions may be used by the verification application to achieve these goals. For instance, the SHA-2 family of hash functions may be employed.

The checksums generated by the verification application may or may not be of fixed length. In an alternative, the verification application may be used on multiple components.

Once the checksum has been generated by the verification application, a digital signature may be generated by encrypting the checksum with a private key stored in cryptographic module 139. The generated digital signature may be compared to digital signatures attached to each component to be verified. To perform the comparison, the digital signature may be decrypted using a respective public key. The resulting checksum may then be compared to the checksum generated by the verification application.

After the integrity of all components is verified, a limited set of executable files may be loaded into a part of memory 126 that is identified as read-only by the kernel (block 208). The loaded executable files may constitute the minimum amount required to communicate with a server and provide the user with a basic browsing session to conduct a transaction. Preferably, no third-party system components are loaded in memory 126 (e.g., browser extensions, audio/graphics/chipset drivers, etc.). The remaining executable files stored in memory 126 are marked as "non-executable" by the kernel.

A visual indicator 146 may be displayed on the display 122 of computing device 102 to inform the user that computing device 102 is operating in the secure mode (block 210). For example, the visual indicator 146 may be an icon that symbolizes a secure mode (e.g., a lock) or the visual indicator 146 may be text. Computing device 102 is configured to prevent visual indicator 146 from being rendered during normal operating mode to prevent third parties from misleading the user into believing that the Internet is being accessed in the secure operating mode. For example, a graphics engine may prevent the visual indicator 146 from being displayed during normal operating mode.

After computing device 102 is configured to operate in secure mode, the user may initiate an Internet session (block 212). In the secure operating mode, the user is only permitted to access websites that are recognized by the authorization entity 143 as being secure (e.g., websites 148). In one example, specific websites or services register with the authorization entity 143 to allow user access in secure mode, and the authorization entity 143 verifies the certificates of the registered websites or services. A list of the websites/certificates is signed by the authorization entity 143. Accordingly, computing device 102 may access the approved websites or services via the authorization entity 143. In one embodiment, the list of allowed websites or services can be downloaded from the authorization entity 143 or checked for updates while operating in secure mode. The user may then view the list, search for a specific website using different criteria (e.g., category, name, region, etc.), and select a website to visit.

In one illustrative example, the registration process could be performed by providing the authorization entity 143 with a certificate signed by a trusted third-party. The authorization entity 143 then signs the certificate and includes the signed certificate in authorized website list 141. In another example, the authorization entity 143 performs manual authorization to confirm that the website requesting registration is actually owned by the organization it purports to represent.

The information contained in the certificates retrieved by a client from the authorization entity 143 are suitable for locating and accessing the desired service such that additional steps are not required to resolve a service provider's address. For example, a certificate containing merely the service provider name and the website domain name would be inadequate, since the client would still need to query a DNS server for the IP address of the website. Such additional steps may expose the client to DNS spoofing attacks. Therefore, the certificate should include a service provider name, website domain, and an IP address all of which are digitally signed by the authorization entity 143. As will be discussed in more detail below, all traffic between the user and the remote service (whether or not HTTP traffic) is preferably encrypted. Accordingly, the user's computing device is not vulnerable to network sniffing attacks that seek to capture user information.

The files that enable computing device 102 to interact with the website and conduct the transaction are executed in read-only mode. Accordingly, any information a user provides to a website during the transaction is not stored locally on computing device 102. In other words, the user-provided information is transient data since the data is created within an application session. At the end of the session, the data is discarded without being stored. As a result, information provided by the user cannot be intercepted by third parties because no information is stored on computing device 102 during the transaction. Accordingly, the user is provided with a secure terminal for security-critical services without exposing the user to security threats that would exist otherwise.

Figure 4A:
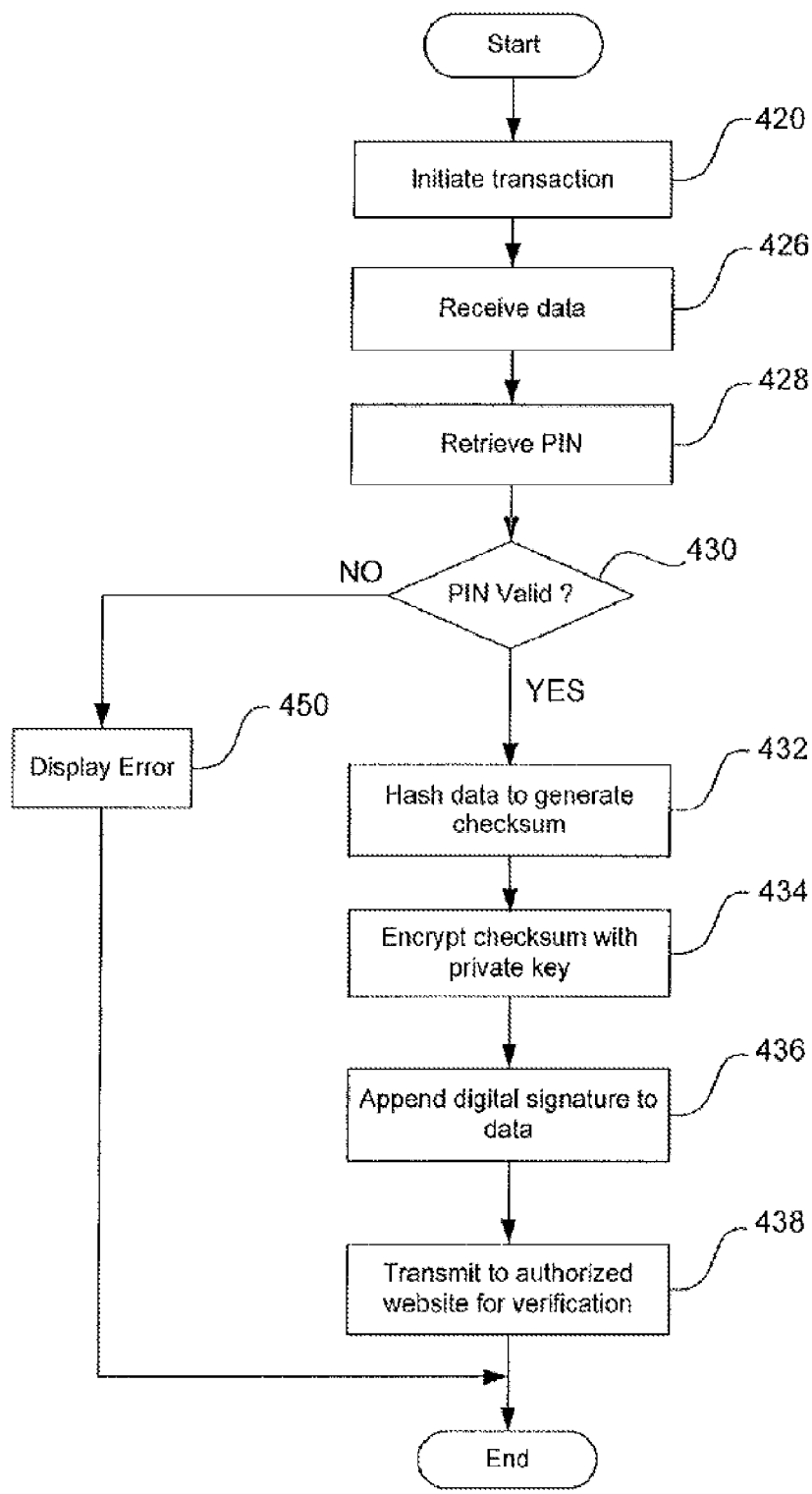
FIGS. 4A-4B illustrate a system and method for appending a digital signature to data transmitted during a secure transaction.
Figure 4B:
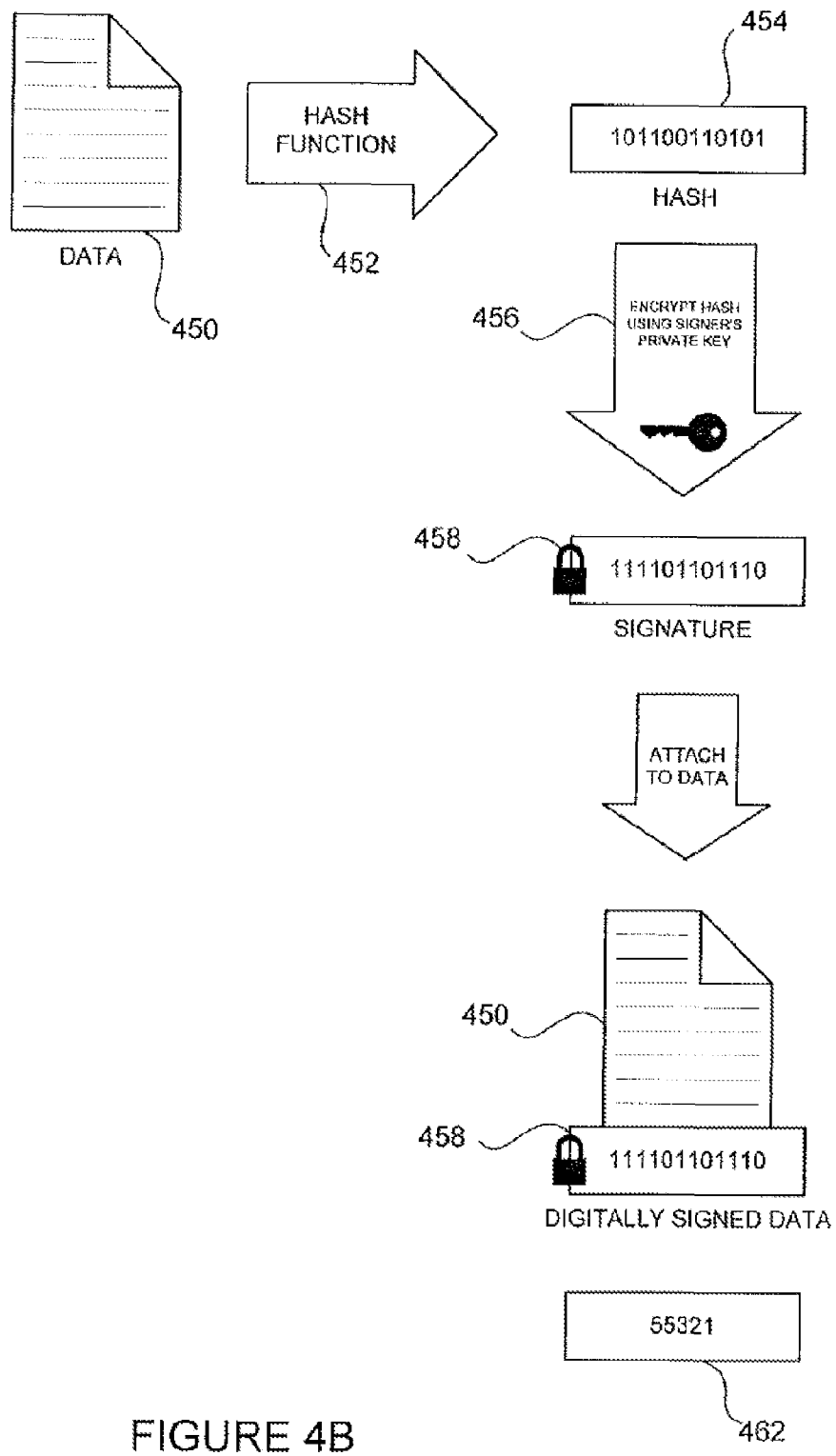

Another example embodiment is shown in FIGS. 4A-4B, which illustrate how a user may digitally sign data transmitted to a remote computer hosting an authorized website. FIG. 4A is a flow diagram of a method for digitally signing the data and FIG. 4B shows general aspects of an illustrative digital signature process. The graphical illustrations of FIG. 4B will be discussed below with regard to flow diagram of FIG. 4A.

Briefly, a user specifies transaction details on a remote website via a client browser. Before the transaction is approved, the remote website requests the user's signature to be attached to the specified transaction. The remote website sends the client browser a web page that contains special markup tags that identify the transaction fields, such that the fields may be automatically captured by the client browser. The browser initially displays the captured fields to the user on-screen, before requesting the user's PIN, in order to eliminate the possibility of signing a wrong transaction by the user.

Computing device 102 initiates a transaction with a website recognized as secure by authorization entity 143 (block 420). A user may then enter the data and the computing device may receive the data (block 426). For example, a user may specify transaction details (e.g., fields) on a website. After properly formatting the fields and adding a unique identifier to the transaction, the website responds with the same fields marked with special tags. The browser automatically identifies the fields and displays them to the user to confirm that this is the transaction to be processed.

Upon confirmation, the browser requests user's PIN to authenticate the user to the cryptographic module 139. Processor 124 may request the user to enter a PIN to verify that the user is authorized to access the private key in accordance with instructions in the cryptographic module 139. The instructions may instruct processor 124 to retrieve the PIN (block 428). Processor 124 may then determine if the PIN is valid (block 430). The cryptographic module 139 may then sign the transaction and sends the signature back to the browser. The browser may then paste the signature into a field in the web form.

If the PIN is valid, the data entered by the user may be hashed to generate a checksum (block 432). For example, as shown in FIG. 4B, data 450 is hashed via hash function 452 to generate checksum 454. Hash function 452 may utilize any known hashing algorithms, such as the SHA-2 family of hash functions.

The checksum may be encrypted using the private key stored in the cryptographic module 139 (block 434). In the working example of FIG. 4B, digital signature 458 is derived by encrypting checksum 454 with the private key 456. Once the digital signature is generated, the digital signature may be appended to the data (block 436). The data 450 appended with the digital signature 458 and a unique identifier 462, which is associated with the cryptographic module 139, are transmitted to authorized website 148 for verification (block 438). Alternatively, the digital signature may be separately transmitted to authorized website 148 for verification before transmitting the data.

Figure 5A:
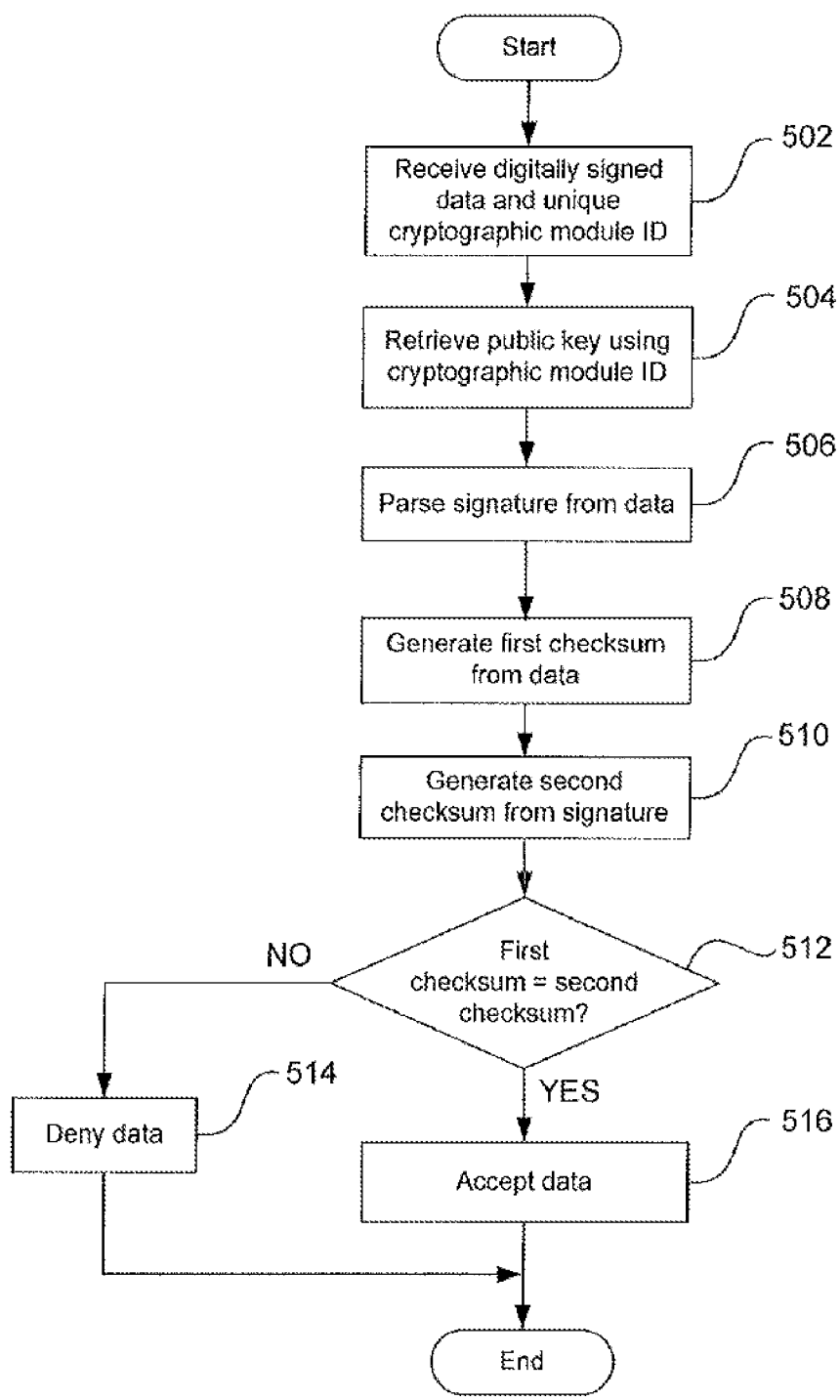
FIGS. 5A-5B illustrate a system and method for verifying a digital signature attached to data received during a secure transaction.
Figure 5B:
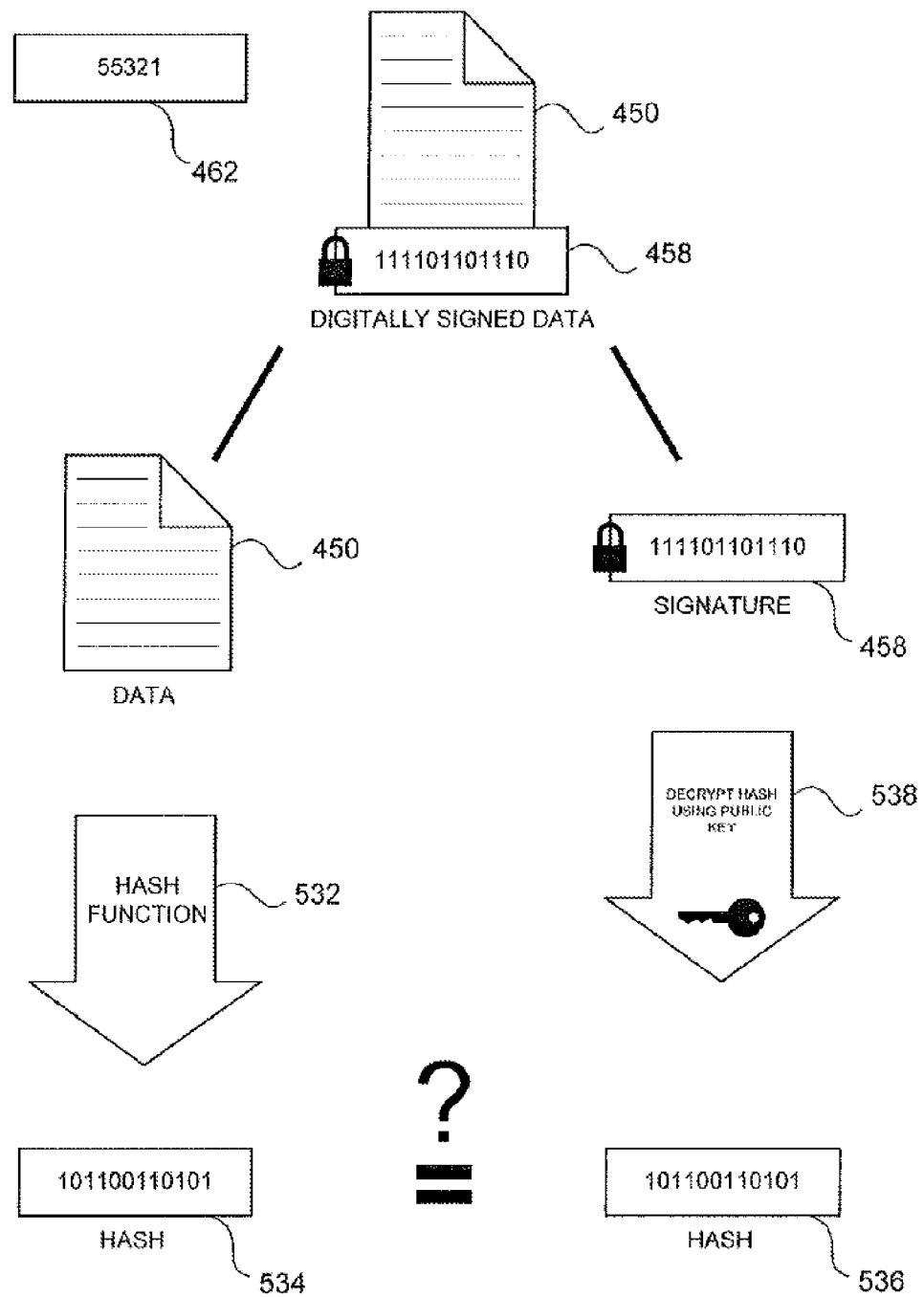

FIGS. 5A-5B illustrate how the digital signature generated by cryptographic module 139 may be verified. FIG. 5A is a flow diagram of a method for verifying the digital signature and FIG. 5B shows general aspects of the verification and decryption. The verification may be performed by the authorized website with which a secure transaction is being conducted or by some other process of the remote computer hosting the authorized website. In an alternate embodiment, computer 104 may be configured as a trusted third party server that may be utilized to verify the digital signature. In that regard, the third party server may notify authorized website 148 whether the digital signature is valid.

Briefly, a cryptographic module identifier is known in advance by the service provider, and is associated with the user's account. Accordingly, the cryptographic module identifier does not have to be sent again by the client with the signed transaction, because the remote service provider verifies the transaction signature against the public key identified with the cryptographic module identifier associated with user account. Sending the cryptographic module identifier is useful in cases where, for example, the account has multiple owners that are authorized to perform certain transactions on the account.

The digitally signed data and the unique identifier 462 of the cryptographic module 139 are received (block 502). The public key may be retrieved from the public key list 142 by using the unique identifier 462 as a reference (block 504).

After retrieving the public key, digital signature 458 may be parsed from data 450 (block 506). A special delimiter may be inserted between digital signature 458 and data 450 to allow a parsing algorithm to distinguish between the signature and the data.

The first checksum 534 may be generated by applying hash function 532 to data 450 (block 508). Preferably, the algorithm employed by hash function 532 matches the algorithm employed by hash function 452 to ensure the resulting checksums are identical. A second checksum 536 may be generated by decrypting digital signature 458 with public key 538 (block 510).

The first checksum 534 may be compared to the second checksum 536 to determine if the digital signature is valid (block 512). If the first checksum 534 matches the second checksum 536, the data may be accepted (block 516). The acceptance may be followed by an acceptance notification sent to computing device 102. If the first checksum 534 is not equal to the second checksum 536, the data may be denied (block 514). The denial may be followed by a denial notification sent to computing device 102. The verification may then terminate.

After the user is finished with the transaction, the user may conduct another security-critical transaction at the same website or at another authorized website. Alternatively, the user may reboot computing device 102 to operate in the normal mode to permit computing device 102 to access any available website (e.g., websites 150).

In the system described above with reference to FIGS. 3A-5B, users are provided with a secure mode of operation on a general purpose computing device that provides a physical authentication and authorization factor (e.g., a built-in smart card reader, hardware chip, etc.). In the event that a remote attack succeeds in compromising the security of the normal (non-secure) operational mode and deceiving a user to unwittingly input confidential information (e.g., passwords, PINs, etc.), the attacker may successfully process fraudulent transactions on behalf of the user. The attacker may execute unauthorized transactions by remotely accessing the same physical authentication and authorization factor that the user normally uses to electronically sign legitimate transactions (e.g., a built-in smart card reader).

In order to eliminate the need to rely on the user to detect a compromised client, a server may reliably verify the security of the client computing environment in real time. This allows service providers to only accept transaction requests from pre-registered client computing devices that can verify their security at the time of requesting the transaction. In the event that the user unwittingly inputs confidential information on a compromised computing device, the information will be useless to remote attackers who do not have physical access to the user's device operating in secure mode.

There is a technical difficulty in performing remote integrity verification, also referred to as remote integrity attestation. In conventional computing environments, any response expected from a genuine client device can be replayed/faked by a compromised/malicious client device; even when specialized cryptographic hardware is used, such as a TPM chip. Most computing devices may be modified at different levels (e.g., software application, device driver, operating system, hardware, etc.), data stores may be accessed and copied, and virtual/physical data paths may be intercepted. These computing environment features may enable a remote attacker to access user information in different ways.

In one example, a malicious entity may modify a user's computing environment to report a genuine status to a remote web service provider when the integrity of the user's computing system is being compromised. This may expose the user's information to the attacker while both the web service provider and the user believe the computing device is operating in a secure mode.

In another example, a malicious entity may access a user's computing environment to have verification/attestation information sent to the entity rather than to the web service provider. In this case, the malicious entity may use the information to authenticate the entity to the remote service provider as the user's genuine client device. For example, an attacker may access a bank's website and claim that he is a certain user. The bank may send the attacker a request for integrity verification. If the software in the user's platform is not secure it may be compromised to forward the integrity verification to the attacker, and the attacker may forward the integrity verification to the bank. Accordingly, the attacker is able to fraudulently authenticate himself to the bank. This type of malicious interference with another user's computing environment is commonly referred to as a "man-in-the-middle attack".

Conventional remote integrity verifications solutions rely mainly on software-initiated checks, which may be easily forged. There are several ways in which software-based solutions can be rendered useless, such as by copying, patching, emulating, intercepting, etc. Antivirus checks, software authenticity checks, and similar software verifications can be easily circumvented, making an integrity check unreliable in the context of verifying client environment security.

Hardware-based integrity checks may be unreliable for use in security-critical online transaction processing systems for remotely verifying client security. The trustworthiness of hardware-initiated remote attestations may be affected by different factors.

In one example, a computing environment may be physically moded so that the hardware which performs integrity checks is provided with false information about the computing environment. For example, a TPM chip that probes a client hardware or software configuration may be provided with forged responses due to a physical modification of its hardware connections.

In another example, even if communication from a web service provider is encrypted under the service provider's public key to prove the authenticity of the integrity check request source, a malicious entity may forward what appears to be a genuine request from the web service provider to a user's computing device. The device may respond with identity verification to the malicious entity (assuming that the client software, e.g., browser, on the computing device is modified). The malicious entity may then forward the response to a remote web service provider, and the provider would mistakenly identify the malicious entity as the actual user.

A secure and trustworthy technique for remote verification/attestation solves the problem of forging and/or forwarding remote attestations. In accordance with example embodiments, a client computing environment ensures that the verification/attestation process is performed by specialized, custom-manufactured hardware of the client device. Any modification to the hardware or software of the computing device does not result in a false attestation. Verification software executing on the computing device is part of an integrity verification process and ensures that the verification/attestation information can only be requested by or sent to genuine (secure) parties. The software executing on the computing device also exposes a limited user interface that cannot be used to modify system behavior such that verification information is sent to untrusted entities. By providing a limited hardware/software interface that cannot be manipulated to provide false information to a server, integrity verification may be performed in a trusted, secure manner.

The hardware of the computing device is tamper resistant. If the verification is performed by hardware through connections to other devices, it may be possible to tamper with the hardware. For example, a malicious entity may change the wiring or physical connections of an integrated circuit chip that includes the integrity verification module 137 so that the hardware configuration does not detect that the system is not secure. To prevent any unauthorized change to the client device, any attempt to tamper with the hardware may result in "zeroing" the data on the integrity verification module 137 that performs the integrity check and verification/attestation process. Accordingly, any subsequent attempt to prove system integrity will fail because the operating system of the computing device cannot communicate with the integrity verification module 137.

When the computing device is switched on, the integrity verification module 137 performs the verification/attestation process. In one example, the integrity verification module 137 is included as part of a IBM chip. The integrity verification module 137 performs a full integrity check of the system (e.g., hardware, software, etc.) during system startup (but before system boot) to ensure shat she system is secure. The integrity check may include executing a driver to issue challenges to the system and receiving integrity verification responses to the challenges. If the check fails because, for example, she hardware has been tampered with, the integrity verification module 137 is disabled from functioning for the remainder of the computing session (e.g., until the system is shut down).

In the event that the system passes the integrity check, the integrity verification module 137 is exposed and made available for she remainder of she computing session. The initial integrity check verifies that no untrusted software (e.g., boot loader, operating system kernel, driver, application, etc.) will execute on the computing device during the computing session. Accordingly, verification/attestation requests are only accepted from or provided to genuine parties.

Before the system is booted, the system exposes a limited amount of hardware, software and network interfaces. Accordingly, both local and remote malicious entities are prevented from modifying any software so that only the integrity verification module 137 responds to verification/attestation requests received from authorized entities. In addition, the limited exposure of the system ensures that the system attested for is indeed secure. A system with a large attack surface is not reliable in this context, since it is practically impossible to verify that the system does not contain vulnerabilities that can be exploited to cause the system to behave incorrectly, even after a successful initial integrity verification.

Conventional operating systems and software applications make the process of remote integrity verification practically useless. Such environments cannot ensure that no vulnerabilities exist that will allow a remote attacker to modify system behavior at any stage during system operation. Therefore, even if an initial software image loaded from a disk passes an integrity check, the system may not be considered secure enough for use in the context of security-critical online transaction processing systems.

The embodiments described above with reference to FIGS. 3A-3B disclose a software system that provides a high level of security when combined with the described hardware configuration. An operating system may be booted in a secure operation mode, where only the user has access to an Internet browsing session. All third-party browser extensions are disabled, all traffic is encrypted, and only a predetermined set of trusted web sites may be accessed during the secure operation mode.

The embodiments described above with reference to FIGS. 4A-5B disclose a system with reliable remote attestation capability.

The above-described embodiments consider the system to be genuine when operating in the secure mode. In accordance with other example, embodiments, the above-described verification/attestation process may be relied on to verify client environment security in the context of security critical online transaction processing systems.

Figure 6:
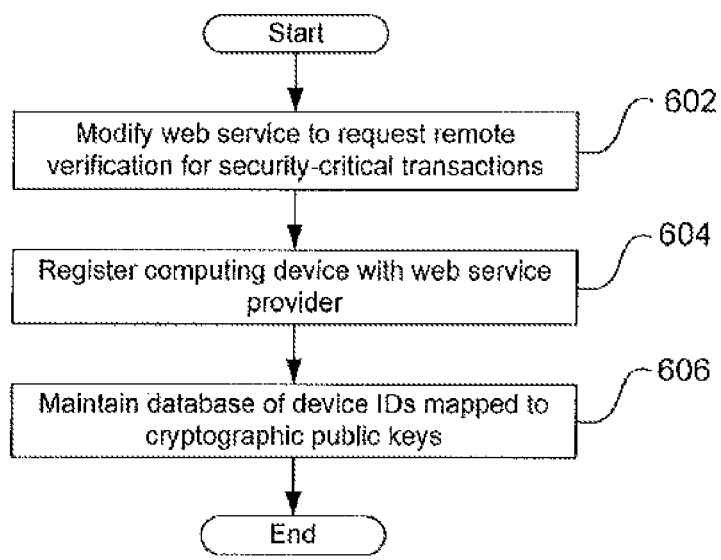
FIG. 6 illustrates of a method for initializing a computing device for integrity verification.

FIG. 6 illustrates a method for initializing a computing device for integrity verification. The method may be a setup process for enabling a request and verification of remote integrity information by service providers. The initialization method begins when service providers modify their web services so that remote attestation is requested and verified with every security critical transaction (block 602). Users register their computing devices with selected web service providers (block 604). The computing device 102 may be registered via the Internet or by using out-of-band communication. The device 102 itself may be registered using a serial number, or only its cryptographic module 139 may be registered. Registration of user computing devices enables web service providers to query a trusted third party for a public key associated with the cryptographic module 139 on each computing device 102 used by an end user to process a transaction.

A trusted third party maintains and serves database that maps computing device identifiers (e.g., serial numbers) to public components of the cryptographic keys stored on the cryptographic module 139 of the computing devices 102 (block 606). An example of a trusted third party is the computing device manufacturer. The information retrieved from the database enables web service providers to verify remote verification/attestation information provided by client computers.

In case a general-purpose computing device is used, a user may then be required to reboot to the secure mode before using security-critical Internet services. Operating in the secure mode ensures the effectiveness of an integrity check performed by built-in hardware.

Figure 7:
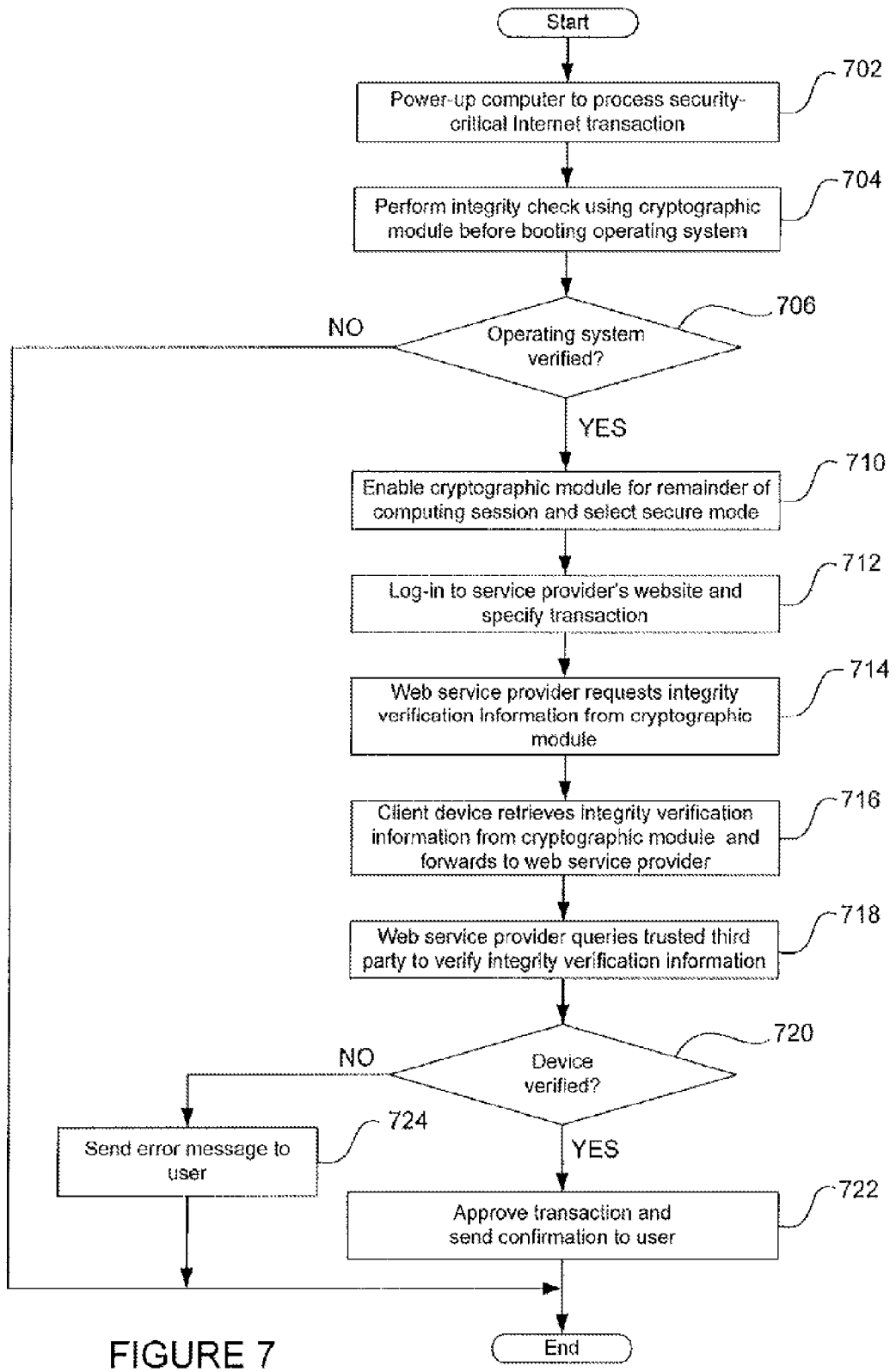
FIG. 7 illustrates of a method for verifying the integrity of a computing device.

FIG. 7 illustrates a method for verifying the integrity of a computing device. The verification/attestation method begins when the computing device is powered-up (block 702). The integrity attestation hardware of the computing device that is responsible for verification (e.g., the integrity verification module 137) performs a hardware/software integrity check of the system before the operating system is booted and (in some cases) after a particular boot mode is selected (block 704).

In one illustrative example, the integrity check may be performed by verifying connected hardware components and cryptographically verifying an operating system image, for example, by comparing its checksum to one that is digitally signed by a trusted third party to determine whether the operating system of the device has been modified.

In another illustrative example, the integrity check is performed before booting the system because even though the hardware or software may have been modified, the software may be compromised so that the operating system appears to be unmodified to the verification logic of the integrity verification module. By verifying that the system is unmodified, the system may be subsequently assumed to remain secure based on the earlier verification. Specifically, off-line verification using the checksum of the operating system not yet loaded into memory may be considered as being more trustworthy than verification performed after the operating system is booted.

In still another illustrative example, selecting "secure mode" causes a current bootloader to be replaced with a bootloader having a secure mode configuration, and then the system is rebooted. An integrity verification check is performed when the system starts, and the integrity verification check passes if the bootloader has the secure mode configuration. When the bootloader is only configured in the secure mode, the system restores the original bootloader after completing the initial boot process, so that the original bootloader executes during a subsequent reboot.

A determination is then made whether the operating system is verified (block 706). In the event that the system fails the integrity check during start-up and is not verified, the cryptographic module 138 is not enabled (or is disabled) prior to system boot for the remainder of the computing system, and processing terminates.

In some embodiments, the integrity verification module 137 may be prevented from ever disabling the cryptographic module. Rather, the integrity verification module stores a result of hardware verification and a checksum of the operating system image in local storage after completing the hardware/software checks but prior to loading the operating system. The storage is identified as read-only for the remainder of the computing session. The cryptographic module 138 may then respond to machine verification requests with the information that is stored in the read-only local storage. The information is retrieved from the read-only storage and forwarded to the requesting party along with the response to a cryptographic challenge sent by the party. The complete response may be encrypted using a private key of the cryptographic module 138.

Preventing enabling/disabling of the cryptographic module 138 introduces significant flexibility by delegating to the requesting party the responsibility of approving or rejecting the machine's "state". In other words, instead of having the integrity verification module approve/reject the machine's state (and consequently enable/disable the cryptographic module 138) based on hardware and operating system verification results (which would then normally restrict the acceptable operating systems to those which have a checksum signature attached that is signed by a trusted party), the integrity verification module 137 simply stores a check result and forwards this information to requesting parties. The requesting parties then compare the received checksum against a list of checksums that are known to be good, depending on the needs of the party. For example, a bank might only accept transactions from a machine whose integrity verification module responds with the checksum of an approved "secure mode" that disables all potentially dangerous aspects of the operating system. Similarly, an enterprise might accept connections from the same device if the operating system image checksum matches any of the enterprise-approved configurations.

By not allowing the cryptographic module 138 to be enabled/disabled, the possibility of a successful man-in-the-middle attack may occur in the event that the operating system is not secure enough to prevent a remote attacker from compromising device security and act as a proxy between a service provider and a user victim. Accordingly, the attacker's computing device may be authenticated in place of the victim's. As a result, using the integrity verification module 138 to verify a general-purpose operating system (e.g., Windows, Linux, etc.) may not be reliable.

Referring back to FIG. 1, the system passes the integrity check because the hardware of the computing device is genuine. When the system is verified, the secure mode image of the computing environment is loaded into the memory of the client computing device by, for example, the bootloader. The operating system may boot to a browser session which is capable of communicating with the cryptographic module 138. The cryptographic module 138 is then enabled for the remainder of the computing session and the secure mode of the operating system is selected (block 710). The enabled cryptographic module 138 may then respond to challenges received from a server.

In the secure operating mode, the operating system only communicates with trusted parties via the browser. In other words, requests are not accepted from unknown IP addresses, and access to cookies, session identifiers, etc., is denied. In addition, the presented user interface limits access so the computing session to prevent interference from a remote attacker. For example, arbitrary code cannot be executed while in secure mode, which prevents a remote attacker from installing a "Trojan Horse" application.

The user then logs-in to the system and accesses a website of a desired service provider (e.g., a bank) (block 112). The user may then log-in to the website and specify the details of the transaction to be processed. For example, the user may access a bank website to conduct a financial transaction. In some embodiments, an HTML tag associated with the website is accessed by the cryptographic module 138 to ensure secure communication with the website.

The web service provider requests integrity verification information from the cryptographic module 138 of the client device (block 714). An example of the requested information may be a message encrypted under a private key of the cryptographic module 138 to show that device integrity is verified. The message may include a random challenge, timestamp or hardware/software identification. In this case, the user may be required to sign the transaction using a SIM card. In another example, the web service provider sends a challenge to the cryptographic module 138 to determine whether the device is operating in the secure mode. A transaction signature and an integrity attestation are provided for every transaction using different system components. Transaction authorization indicates whether the user is the account owner, and integrity attestation indicates whether the computing device is secure.

The computing device then retrieves the requested integrity verification information and forwards the retrieved data to the web service provider (block 716). The operating system of the computing device invokes the integrity verification module 137 to attest for system integrity. The operating system may send the service provider the information retrieved from the cryptographic module 138 using a web browser.

The web service provider queries a trusted third party to verify the integrity verification information received from the cryptographic module 138 of the client computing device (block 713). The web service provider may access a known public key from, for example, a website associated with a manufacturer of the computing device. The third party website may maintain a database that maps computing device identifiers to public keys. The computing device may then be verified by comparing the verification information retrieved from the cryptographic module 138 to known data of the integrity verification module 137 retrieved from the trusted third party website.

A determination is made regarding whether the computing device is verified (block 720). If the device is successfully verified because, for example, the data from the cryptographic module 138 corresponds to the data associated with the integrity verification module 137 retrieved from a trusted site, the user transaction is approved and a confirmation is sent to the user (block 722). In the event that the device is not verified, an error message is sent to the user (block 724), and processing terminates.

Although the disclosure herein has been described with reference to particular embodiments, it is to be understood that these embodiments are merely illustrative of the principles and applications of the disclosure. For example, the disclosure has been described with reference mainly to general purpose computers. However, example embodiments may be used in conjunction with special-purpose computing devices, such as e-book readers, hardware media players, gaming consoles, smart phones, tablets, etc. Accordingly, the present disclosure is particularly useful in preventing the unauthorized distribution of copyrighted material. For example, since the client device is tamper resistant, encrypted material that is downloaded to the device cannot be accessed by unauthorized third parties.

In addition, different software may be used with the described hardware for other applications, such as licensed digital media access, on-line multiplayer gaming, etc. It is therefore to be understood that numerous modifications may be made to the illustrative embodiments and that other arrangements may be devised without departing from the spirit and scope as defined by the appended claims.

The invention claimed is:

1. A computer-implemented method of providing a secure operating mode of a computing device, the method comprising:

receiving a signal to provide power to a computing device;

before booting an operating system of the computing device, determining whether an integrity of a bootloader is verified using an integrity verification module;

upon verification of the integrity of the bootloader and before beginning to boot the operating system, verifying, by the bootloader, an operating system kernel;

upon verification of the operating system kernel, verifying, by the operating system kernel, at least one executable file necessary to provide the computing device a basic browsing session to conduct a transaction with a first computer;

loading, by the bootloader, the at least one verified executable file into a memory;

upon loading the at least one verified executable file into the memory, setting the memory as a read-only memory;

enabling a cryptographic module to forward an indication that the computing device is secure to the first computer;

receiving a response to the forwarded indication from the first computer, wherein the response indicates that the computing device is secure; and initiating a transaction with the first computer, via the browsing session of the computing device, using the at least one verified executable file executed in a read-only mode.

2. The computer-implemented method of claim 1, further comprising when the integrity of the computing device is not verified, disabling communication between the cryptographic module and the operating system of the computing device.

3. The computer-implemented method of claim 1, further comprising providing a limited user interface, wherein the limited user interface cannot be used to interfere with communication between the computing device and the first computer.

4. The computer-implemented method of claim 1, further comprising receiving confirmation of the transaction via the browsing session of the computing device.

5. The computer-implemented method of claim 1, wherein the integrity verification module determines whether the integrity of the computing device is verified by:

issuing challenges to the operating system of the computing device, and receiving responses to the challenges from the operating system.

6. The computer-implemented method of claim 1, further comprising initializing the computing device for integrity verification by registering the computing device with the first computer.

7. The computer-implemented method of claim 6, wherein registering the computing device comprises registering the cryptographic module with the first computer.

8. The computer-implemented method of claim 6, wherein registering enables the first computer to query a second computer for a corresponding public key associated with the cryptographic module.

9. The computer-implemented method of claim 8, wherein the second computer maintains a database that maps an identifier of the computing device to the corresponding public key.

10. The computer-implemented method of claim 8, further comprising:

generating a digital signature; and transmitting the digital signature and an identifier of the computing device to the first computer, wherein the identifier of the computing device associates the cryptographic module with the public key adapted for decryption of the digital signature.

11. The computer-implemented method of claim 10, wherein generating the digital signature comprises:
deriving a checksum based on information associated with the transaction; and
encrypting the checksum with the private key stored in the cryptographic module.

12. The computer-implemented method of claim 10, wherein the private key corresponds to the public key such that the digital signature is decryptable with the public key.

13. The computer-implemented method of claim 1, further comprising, when the integrity of the computing device is not verified, disabling the cryptographic module.

14. A system for providing a secure operating mode of a computing device, the system comprising:
an integrity verification module operable to:
receive a signal to provide power to the computing device; and
determine that an integrity of a bootloader is verified before the operating system is booted;
upon verification of the integrity of the bootloader, the bootloader operable to:
verify, before beginning to boot the operating system, an operating system kernel, and upon verification of the operating system kernel, verify, by the operating system kernel, at least one executable file necessary to provide the computing device a basic browsing session to conduct a transaction with a first computer; and
load the at least one verified executable file into a memory;
an operating system kernel operable to:
set the memory as a read-only memory upon loading the at least one verified executable file into the memory;
a cryptographic module operable to:
forward an indicator that the computing device is secure to the first computer;
receive a response to the forwarded indicator from the first computer, wherein the response indicates that the computing device is secure; and
initiate a transaction with the first computer, via the browsing session of the computing device, using the at least one verified executable file executed in a read-only mode.

15. The system of claim 14, wherein, when the integrity of the computing device is not verified, the integrity verification module is operable to disable communication with the operating system of the computing device.

16. The system of claim 14, wherein the integrity verification module is operable to provide a limited user interface that cannot be used to interfere with communication between the computing device and the first computer.

17. The system of claim 14, wherein the cryptographic module is further operable to:
generate a digital signature; and
transmit the digital signature and an identifier of the computing device to the first computer, wherein the identifier of the computing device associates the cryptographic module with a public key adapted for decryption of the digital signature.

18. The system of claim 17, wherein the cryptographic module generates the digital signature by:
deriving a checksum based on information associated with the transaction; and
encrypting the checksum with a private key stored in the cryptographic module.

19. The system of claim 17, wherein the indicator that the computing device is secure corresponds to the public key such that the digital signature is decryptable with the public key.

20. The system of claim 14, wherein the cryptographic module is one of a smart card, a subscriber identification module and a custom cryptographic chip.

21. The system of claim 14, wherein the cryptographic module is a trusted platform module.

\* \* \* \* \*